Nov. 28, 1944.   J. H. MOREHEAD   2,363,545
MEASURING INSTRUMENT
Filed Jan. 4, 1943
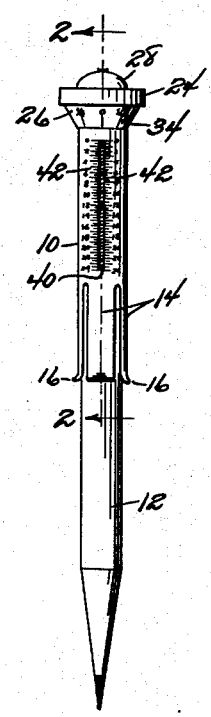
Fig.1.
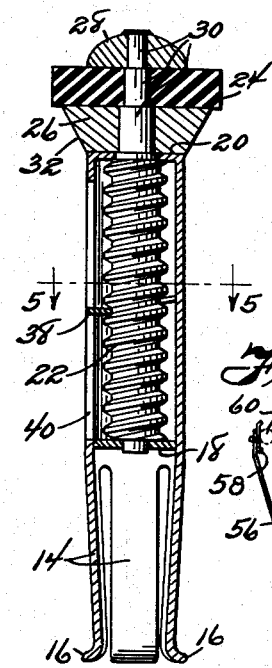
Fig.2.
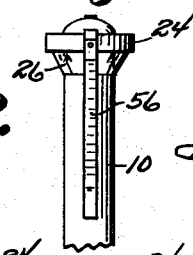
Fig.10.
Fig.3.
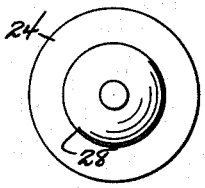
Fig.11.
Fig.4.
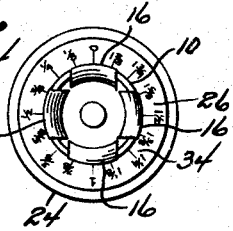
Fig.5.
Fig.6.
Fig.8.
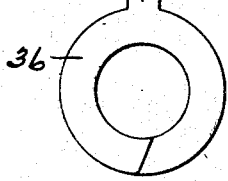
Fig.7.
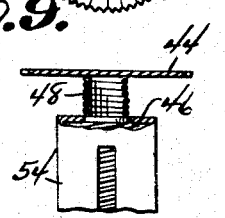
Fig.9.
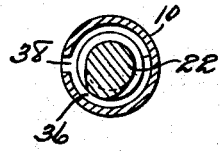
John H. Morehead
INVENTOR.
BY
Victor J. Evans & Co.
ATTORNEYS Patented Nov. 28, 1944

2,363,545

UNITED STATES PATENT OFFICE 2,363,545

MEASURING INSTRUMENT

John H. Morehead, Long Beach, Calif.

Application January 4, 1943, Serial No. 471,304

2 Claims. (Cl. 33—141)

My invention relates to measuring devices, and has among its objects and advantages the provision of an improved roller rule wherein distance and dimensions may be readily ascertained by moving a measuring wheel along a surface to be measured, wherein a novel screw action is employed for moving an indicator which records the distance traveled by the wheel.

In the accompanying drawing:

Figure 1 is a view showing my invention applied to an ordinary lead pencil.

Figure 2 is an enlarged sectional view along the line 2—2 of Figure 1.

Figure 3 is a top end view.

Figure 4 is a bottom end view.

Figure 5 is a sectional view along the line 5—5 of Figure 2.

Figure 6 is an edge view of a spiral washer indicator.

Figure 7 is a face view of the washer.

Figure 8 is a face view of a modified form of measuring wheel.

Figure 9 is a sectional view along the line 9—9 of Figure 8.

Figure 10 is a face view of a guide for holding the measuring wheel in engagement with the work to be measured, and Figure 11 is an edge view of the guide.

In the embodiment of the invention selected for illustration, I make use of a barrel or shell 10 of such diameter that an ordinary lead pencil or fountain pen 12 may be inserted therein. The barrel is slotted inwardly of its pencil receiving end to provide pencil engaging spring fingers 14 which frictionally grip the writing instrument. All the fingers are flared outwardly at 16 to facilitate insertion of the pencil.

A bearing washer 18 is fixedly secured to the inner face of the barrel, as by welding. An end washer 20 is welded to the barrel to close one end thereof. A screw 22 is arranged coaxially inside the barrel 10 and is rotatably supported by the washers 18 and 20, although the screw is restrained from axial movement.

To the outer end of the screw is fixedly attached a composition wheel 24 to be rolled on the article being measured to impart rotation to the screw. This wheel is clamped between bodies 26 and 28 mounted on the shaft end 30 of the screw 22. The circumference of the wheel measures two inches, and the tapered face 32 of the body 26 is marked with one-eighth inch graduations, as at 34, to indicate short wheel measurements.

For the purpose of recording longer measurements, a split washer indicator 36 is bent into spiral contour for threaded connection with the screw 22. This washer indicator has a lug or pointer 38 which projects through a longitudinal slot 40 in the barrel 10. Rotation of the screw 22 imparts movement to the indicator 36 longitudinally of the barrel, since the pointer 38 restrains the indicator from relative rotation with respect to the barrel.

Graduations 42 in values of two inches and one-half inch are marked on the barrel 10 along both sides of the slot 40, so that the distance measured by the wheel 24 will be indicated by the pointer on either set of graduations. The position of the indicator may be read from either side of the slot 40. Two inches of movement of the pointer 38 equals one circumference of the wheel 24.

The split washer indicator 36 permits the use of a screw having a greater pitch than in ordinary threaded connections. Twelve threads per inch in a screw having a one-quarter inch diameter may be used with the split washer indicator. Ordinary threaded feed connections in a device of this nature requires at least eighteen threads per inch. The screw action illustrated is durable and efficient.

Figures 8 and 9 illustrate a modification in that the measuring wheel 44 is fixed to the screw 46 by a short close wound spring 48 wound with initial tension. The peripheral face of the wheel 44 is notched at 50 for gripping purposes. This form of the invention is a handy instrument for tracing irregular lines on drawings, maps and the like, and the spring 48 lends a desirable element of flexibility to the wheel mount.

One-eighth inch graduations 52 are marked on the outer face of the disk throughout the two inch measuring circumference of the wheel 44. This makes it easy for the operator to follow the small measurements with his eyes, and the longer measurements may be noted by the position of the indicator on the barrel 54, which is identical with the barrel 10.

Figures 10 and 11 illustrate a flat spring 56 as having one end attached to the barrel 10, with the other end spaced from but extending across the peripheral face of the wheel 24. A slightly dished guide 58 is attached to the inner face and at the free end of the spring. This guide serves as a retainer for holding wires and other small articles in alignment with the wheel. A slight thumb pressure on the springs holds the wheel 24 firmly against the wire or other work being measured.

Without further elaboration, the foregoing will so fully explain my invention, that others may, by applying current knowledge, readily adapt the same for use under various conditions of service.

I claim:

1. In a measuring instrument of the type described, the combination of a member having a scale, a screw rotatably mounted on said member, a split washer having a spiral contour threadedly engaging said screw, a pointer on said washer engaging said member to restrain the washer from relative rotation with respect to the member but movable longitudinally thereof and with respect to said scale through rotation of said screw, a work engaging measuring wheel fixed to said screw for rotating the screw when the wheel is rolled on the work, said scale being co-related to the circumference of said wheel, and a spring having one end attached to said wheel and its other end attached to said screw to flexibly connect the wheel with the screw.

2. In a measuring instrument having a measuring wheel gauged to measure distances by revolutions and provided with a threaded shaft, a support for the wheel and shaft having a slot extending adjacent to and lengthwise of the shaft, and having scale graduations adjacent the slot interpreting measurements determined by rotations of the wheel and shaft; the combination of a spirally shaped traveler on the threads of the shaft for translating rotary movement into reciprocating movement, the body of which is flat and relatively thin to have non-binding engagement with the threads, and provided with a lateral lug on the outside edge to engage and work in the slot to permit movement of the traveler longitudinally of the shaft, but restraining rotational movement thereof with the shaft, and functioning as a pointer for the scale graduations.

JOHN H. MOREHEAD.